June 20, 1961  H. A. GOLLMAR  2,989,147
HCN REMOVAL
Filed March 3, 1958  2 Sheets-Sheet 1

INVENTOR.
HERBERT A. GOLLMAR
BY Oscar B. Brumback
his ATTORNEY

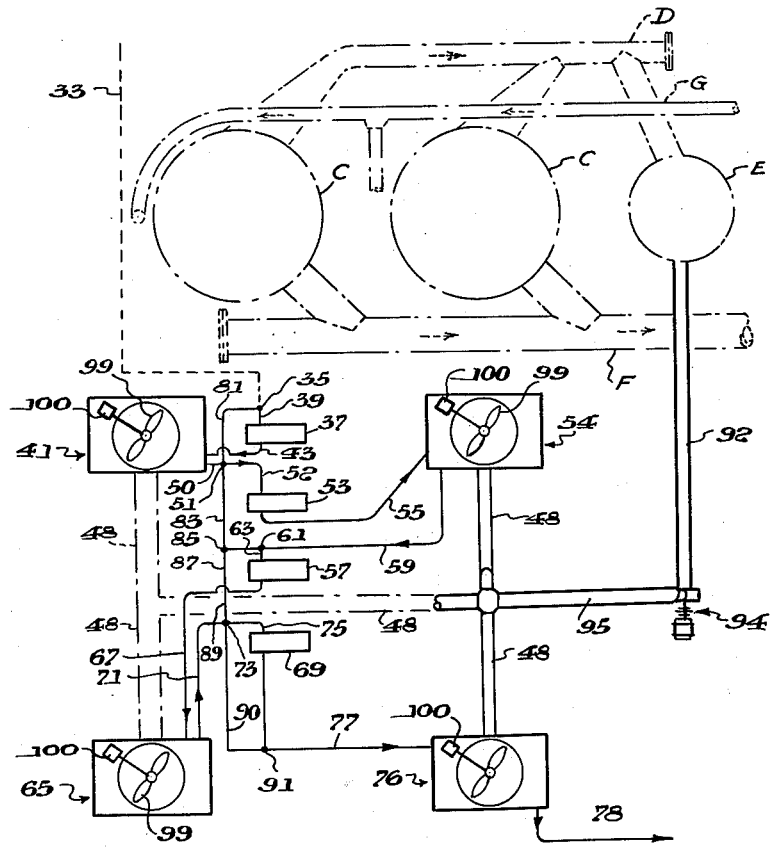

United States Patent Office 2,989,147
Patented June 20, 1961

2,989,147
HCN REMOVAL
Herbert A. Gollmar, Bethel Park, Pa., assignor to Koppers Company, Inc., a corporation of Delaware
Filed Mar. 3, 1958, Ser. No. 718,920
5 Claims. (Cl. 183—114)

This invention relates to a process for removing hydrogen cyanide (HCN) from a gas or a liquid containing HCN.

In many industrial processes, gases are produced which contain HCN and for many years processes have been available for removing the HCN from such gases. For example, since HCN is very soluble in water, one process has comprised the steps of washing the gas with water so as to dissolve the HCN and decomposing the dissolved HCN into other constituents such as by ozonation but the cost of this process and the other processes known heretofore make them prohibitive for most industrial applications. In the steel industry, for instance, where blast furnace gas is normally washed to remove solid particles entrained therein, the blast furnace gas may contain HCN and if this is the case the effluent water from the blast furnace gas washing process dissolves high concentrations of HCN and ozonation has been considered too costly for the removal of the dissolved HCN therein. Consequently the need for an inexpensive process for removing HCN from effluent water such as the wash water from blast furnace gas washing processes is universally recognized.

An object of the present invention, therefore, is to provide an effective process for the removal of HCN from gas or liquid containing HCN.

A further object is to provide a process for removing HCN dissolved in the effluent water of blast furnace gas wash waters.

In accordance with this invention, HCN is eliminated from a gas containing HCN by washing the gas with water so as to dissolve the HCN in the washing water and removing the resulting high concentrations of HCN from the wash water by passing the wash water through a series of aeration towers which utilize air and $CO_2$ gas.

This invention may also operate to remove high concentrations of HCN from water containing dissolved HCN from sources other than gas washing by the same process of removing HCN from blast furnace gas wash waters.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

FIG. 2 is a top view of components of FIG 1.

Figure 1:
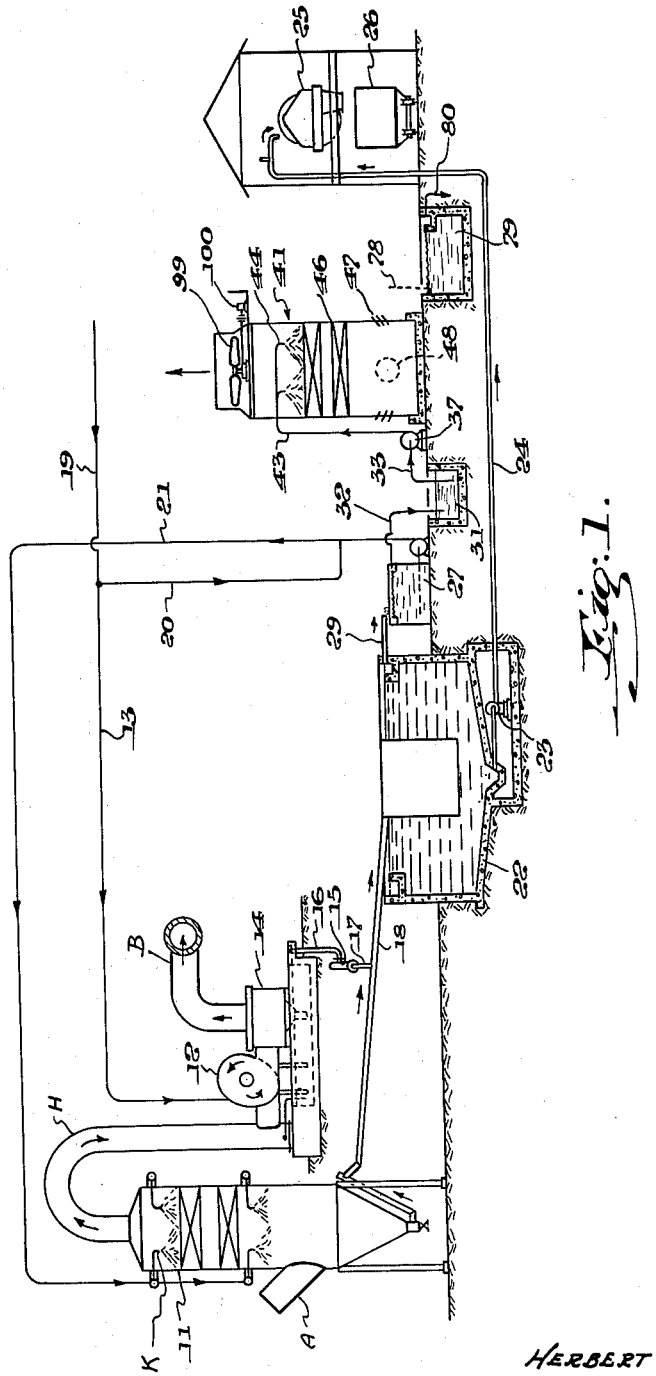
FIG. 1 is an elevational view of the apparatus of this invention.

Referring generally to the figures, a first gas, usually exhaust gas from a blast furnace (not shown) is conducted from the blast furnace through conduit A to conduit B so that it is washed and cleaned in a manner to be described hereinafter, and part of the cleaned gas is conducted from conduit B, FIG. 1, to stoves C, FIG. 2, where it is burned. This first gas after being burned in the stoves C flows through conduit D to a stack E in an arrangement so that normally there is gas containing $CO_2$ going up the stack E. The heat from the burning of the first gas in the stoves C is used to heat a second gas for hot blasting into the blast furnace (not shown) which heated gas passes from the stoves C to the blast furnace through a suitable conduit F.

Referring more particularly now to FIG. 1, raw blast furnace exhaust may contain HCN, especially in ferromanganese furnaces, and this raw gas is cleaned of heavy particles in a dust catcher (not shown) and then introduced into a washer 11 through the conduit A in a manner which is customary in blast furnace operations for cooling and further cleaning of the gas. Advantageously the substantially raw gas, i.e., after passing through the dust collector, is carried to the top of the washer 11 wherein it is exposed to a plurality of water sprays K so that the gas is cooled and solid particles entrained in the gas are removed therefrom. As a consequence of this washing and since HCN is very soluble in water a portion of the HCN which may be contained in this raw stack gas is removed by being dissolved in the wash water.

After washing the substantially clean gas which still has high concentrations of HCN therein passes out the top of the washer 11 through a conduit H to a conventional disintegrator 12 for further treatment to remove the very fine particles still entrained in the gas, and the plant water conducted to the disintegrator 12 by pipe 13 picks up HCN from the gas in the disintegrator. The moisture in the gas after disintegration is then removed by a moisture eliminator 14 well known in the art so that part of the clean gas expelled through conduit B may be conducted to stoves C for burning and thence to stack E in a manner well known in the art and the moisture removed from the gas in the moisture eliminator 14 may contain even higher concentrations of HCN than the water removed from the washer 11. A pump 15 and suitable conduits including conduits 16 and 17 are provided to carry the moisture eliminated from the clean gas by eliminator 14 to conduit 18. Water for the washer 11 is carried from a suitable source through conduits 19, 20 and 21 and water for the disintegrator is carried from conduit 19 through conduit 13.

In the washer 11 solid particles are removed from the raw gas by the water from nozzles K and simultaneously with the removal of these solid particles the water also dissolves HCN contained in the gas because HCN is very soluble in water. Then the water containing the solid particles and dissolved HCN is carried to the bottom of the washer 11 and this effluent passes through conduit 18, together with HCN bearing water from the disintegrator 12 which is introduced into conduit 18 through conduit 17, to a thickening basin 22 wherein the solid particles are settled out of the effluent as a slurry. A pump 23 is provided at the bottom of the thickener 22 for carrying this slurry from the bottom of the thickener 22 through pipe 24 to a filter 25 provided in a filter house such as are well known in the art so that the thickened material may be collected and carried away after collection in filter 25 by a wheeled tram car 26 at the bottom of the filter house.

The cyanide bearing liquid, i.e., containing dissolved HCN, which is clarified by the settling of solid particles in the thickener 22 is carried to a sump 27 through a pipe 29 and this sump 27 is arranged so that part of the clarified effluent may be recirculated with plant make up water from pipes 19 and 20 to the washer 11 through pipe 21 for purposes of economy of operation. Most of the clarified effluent, however, is carried from sump 27 to a receiving basin 31 by pipe 32 from whence the clarified effluent is pumped by suitable pumps through suitable lines for aeration, to be described hereinafter, and this aeration eliminates the high concentrations of HCN from the clarified effluent by transfer of the HCN dissolved in the clarified effluent to a large volume of air mixed with small amounts of $CO_2$ gas.

The aeration of the clarified effluent is advantageously accomplished by pumping the clarified effluent through conventional aeration towers arranged in series. To this end a pipe 33 is connected to a receiving basin 31 at one end and at the other end to a pipe junction 35. This pipe junction 35 is connected to pump 37 by a pipe 39 and this pump 37 is connected to aeration tower 41 by pipe 43. The liquid pumped through pipe 43 is carried to the top of the aeration tower 41 from whence it is sprayed through suitable nozzles 44 on to baffles 46 in the manner of aerating liquids well known in the art so that air which is mixed with $CO_2$ in a manner to be described hereinafter, may be passed through the liquid droplets to remove the HCN from the water into the air and $CO_2$ mixture and thereby to expel the HCN into the atmosphere. These aeration towers are of a standard well known type having a fan 99 driven by a motor 100 at the top and intake baffles 47 and conduits 48 at the bottom for the introduction of air and $CO_2$ or air and stack gas containing $CO_2$. The stack gas may be conveniently obtained from the waste gas from the hot blast stoves (for instance the gas coming out stack E from stoves C) or the stack gas from a boiler house in a manner well known in the art.

The liquid containing dissolved HCN after being aerated in tower 41 may be passed through three or more aeration towers similar to the one described above if one aeration does not remove the desired amount of HCN, thus after being aerated in tower 41 the liquid containing HCN falls to the bottom of tower 41 from whence it is removed through pipe 50 to pipe junction 51 and pipe 52 to pump 53. Pump 53 thereupon pumps the aerated liquid into aeration tower 54 through pipe 55 for aeration in a manner similar to that described with relation to tower 41. The liquid containing HCN after being aerated in tower 54 is removed by pump 57 through pipe 59, pipe junction 61 and pipe 63 and introduced into the third aeration tower 65 through pipe 67. Again the liquid is aerated and then collected at the bottom of tower 65 whereupon it is pumped by pump 69 through pipe 71, pipe junction 73 and pipe 75 and then pumped to aeration tower 76 through pipe 77. Thereupon the liquid is aerated still further in aeration tower 76 or other aeration towers until the desired HCN concentration is obtained and after aeration in the last aeration tower in series the HCN free liquid is collected at the bottom of the last tower and drained through a pipe 78 into a basin 79 from whence the aerated liquid is removed to a sewer by pipe 80. The HCN in the liquid in basin 79, if there is any slight trace of HCN remaining, may be removed, if necessary, by ozonation or chlorination or other means well known in the art.

It is to be noted that during aeration any aeration tower may be by-passed for repair purposes by the use of suitable pipe junctions and two-way valves at these junctions and to this end pipe 81 is attached to pipe junctions 35 and 51, pipe 83 is attached to pipe junctions 51 and 85, pipe 87 is connected to pipe junctions 85 and 73, and pipe 90 is connected to junctions 73 and 91 and conventional two-way valves are attached to the pipe junctions so that the various pipes may be selectively opened or closed.

The stack gas which is introduced to the bottom of the four aeration towers is delivered thereto by suitable connections including a conduit 92 connected to stack E, a fan 94 connected to conduit 92 and conduit 95 which is connected to all four aeration towers by conduits 48. The stack gas is drawn into the aeration towers by the fans 99 driven by motors 100 located at the top of the aeration towers together with the outside air which is introduced through baffles 47 located at the bottom of the aeration towers and mixed in a mixing zone at the bottom of the aeration towers.

It had been found that when the effluent from raw blast furance gas washers containing dissolved HCN, such as the effluent that accumulates in thickener 22, is aerated with atmospheric air alone a precipitate results and this precipitate or scale from aerating this effluent has become extremely troublesome by plugging the pipes, pumps, spray nozzles, and sewer lines through which the clarified effluent flows. Surprisingly, therefore, it has been found in accordance with this invention, for example, that when $CO_2$ in the form of blast furnace stack gas exhaust containing $CO_2$ is mixed with the air used for aeration the accumulation of this scale is eliminated. The reason for this surprising result is not entirely known, but laboratory tests have shown that aeration of the effluent water from washing raw blast furnace gas normally causes scale to form and the pH of the effluent to rise, probably because the water used for washing contains dissolved calcium bicarbonate and the aeration drives off $CO_2$ from the effluent so as to form substantially insoluble calcium carbonate which is a known former of scale and because the calcium carbonate is soluble enough to cause the pH to rise.

Surprisingly it has also been found that ordinary aeration, i.e., aeration without the addition of small amounts of $CO_2$ does not satisfactorily expel the HCN and that addition of the small amount of $CO_2$ in accordance with this invention results in efficient HCN elimination. For instance, the addition of only a small amount of carbon dioxide to the air introduced into the aeration towers as described (as little as 0.25% by volume) results in actual lowering of the pH during aeration and effective removal of the dissolved HCN as well as prevention of scale formation from the effluent.

In operation the raw blast furnace gas is washed by suitable gas washers well known in the art for the removal of solid particles and HCN is also removed from this gas if it contains HCN, and in the latter case the resulting effluent is further treated so that the solid particles entrained therein are settled out, and then the dissolved HCN is removed from the clarified effluent into a mixture of air and $CO_2$ gas by circulating the effluent by suitable means through a plurality of aeration towers in series which utilize air and $CO_2$ for the aeration so that the HCN is disposed into the atmosphere. The HCN removal may be accomplished by one aeration tower but it has been found desirable to use more than one aeration tower and in order to eliminate scale formation which may accumulate due to the aeration in a plurality of aeration towers in the pumps, pipes and nozzles which conduct the effluent containing HCN, and for more effective HCN removal, $CO_2$ gas is introduced from a suitable source at the bottom of the aeration towers along with air for accomplishing the aeration and for preventing scale formation in the aerated effluent.

The process as shown and described is a useful, practical means of expelling HCN from cyanide bearing gas and/or liquid and may be used with existing blast furnace equipment.

Although the foregoing has illustrated and described the invention in detail, it is to be expressly understood that the invention is not limited thereto. Various changes can be made in the design and arrangement of the parts without departing from the spirit and the scope of the invention as will now be understood by those skilled in the art.

What is claimed is:

1. A process for eliminating HCN from HCN-bearing water which comprises mixing $CO_2$ gas with air to raise the $CO_2$ gas content of the air, and introducing relatively large volumes of said mixture of $CO_2$ gas and air into said water substantially at ambient temperature and pressure so that the HCN is substantially removed from said water and carried away into the atmosphere greatly diluted in said mixture, the increased $CO_2$ gas content of the air being sufficient to prevent precipitates from forming in said wash water from which HCN has been removed.

2. The process of claim 1 wherein the mixture contains at least about 0.25% $CO_2$ by volume.

3. A process for removing HCN from blast furnace exhaust gas containing HCN, comprising the steps of washing said gas with water so as to remove the HCN from the gas by dissolving the HCN in said water, mixing $CO_2$ gas with air to raise the $CO_2$ content of the air to about at least 0.25% $CO_2$ gas by volume and thereafter introducing into said water relatively large volumes of said mixture of air and $CO_2$ at ambient temperature and pressure so as substantially to carry away said HCN into the atmosphere greatly diluted in said mixture.

4. A process for removing HCN from HCN-bearing blast furnace gas wash water with solid particles contained therein, comprising the steps of removing solid particles from said water so that said water can be aerated, breaking up said water into fine droplets, mixing $CO_2$ gas with air to raise the $CO_2$ content of the air to about at least 0.25% $CO_2$ gas by volume, introducing substantially at ambient temperature and pressure a relatively large volume of said mixture of $CO_2$ gas and air around and between said droplets so that said water is aerated thereby removing HCN present in the HCN-bearing water and discharging into the atmosphere said HCN greatly diluted in said air and carbon dioxide gas mixture.

5. A process for removing HCN from HCN-bearing water, comprising the steps of mixing air with blast furnace stack gas containing $CO_2$ gas so as to raise the $CO_2$ gas content of the air to about 0.25% $CO_2$ gas by volume, introducing said HCN-bearing water into a plurality of aerating towers arranged in series, introducing relatively large volumes of said mixture into said aeration towers substantially at atmospheric temperature and pressure so that said water is aerated and the HCN is removed therefrom into said mixture of air and stack gas and expelling into the atmosphere said HCN greatly diluted in said mixture of air and stack gas.

References Cited in the file of this patent
UNITED STATES PATENTS

| | | |
|---|---|---|
| 1,701,818 | Mills et al. | Feb. 12, 1929 |
| 2,649,166 | Porter et al. | Aug. 18, 1953 |
| 2,683,734 | Porret | July 13, 1954 |
| 2,693,946 | McIlvaine | Nov. 9, 1954 |
| 2,756,841 | Asendorf | July 31, 1956 |

OTHER REFERENCES

"General College Chemistry" by Babor and Lehrman, Thomas Y. Crowell Co., N.Y., 1946, pages 247 and 494.